United States Patent [19]
Takahashi

[11] Patent Number: 6,153,297
[45] Date of Patent: Nov. 28, 2000

[54] MAGNETIC RECORDING MEDIUM AND METHOD OF MANUFACTURING THE SAME

[76] Inventor: Migaku Takahashi, 20-2, Hitokida 2-chome, Taihaku-ku, Sendai-shi, Miyagi-ken, 980, Japan

[*] Notice: This patent is subject to a terminal disclaimer.

[21] Appl. No.: 08/894,999
[22] PCT Filed: Mar. 8, 1995
[86] PCT No.: PCT/JP95/00380
§ 371 Date: Oct. 17, 1997
§ 102(e) Date: Oct. 17, 1997
[87] PCT Pub. No.: WO96/27877
PCT Pub. Date: Sep. 12, 1996
[51] Int. Cl.$^7$ .................................................. G11B 5/66
[52] U.S. Cl. ................. 428/332; 428/336; 428/694 T; 428/694 TS; 428/900; 427/128; 427/129; 427/130; 427/131; 204/192.2
[58] Field of Search ............... 428/694 T, 694 TS, 428/900, 332, 336; 427/128–131; 204/192.2

[56] References Cited

U.S. PATENT DOCUMENTS 5,587,235  12/1996  Suzuki ................................. 428/332
5,658,658  8/1997   Chen .................................... 428/332
5,678,473  10/1997  Murayama ........................... 428/694 T
5,853,847  12/1998  Tokakashi ............................ 428/141

FOREIGN PATENT DOCUMENTS 60-247825  5/1984  Japan .
62-117143  5/1987  Japan .
5-120664   5/1993  Japan .

*Primary Examiner*—Leszek Kiliman
*Attorney, Agent, or Firm*—Randall J. Knuth

[57] ABSTRACT

A mass-producible magnetic recording medium having a ferromagnetic metal layer comprising CoNiCr or CoCrPt alloy, which has a high S/N ratio of electromagnetic conversion and a stable coercive force.

The magnetic recording medium, using magnetic inversion, has a ferromagnetic metal layer comprising CoNiCr or CoCrPt formed on a surface of a substrate body with a metallic base layer therebetween. The ferromagnetic metal layer has an oxygen concentration of not more than 100 wt ppm and contains crystal grains with an amorphous grain boundary.

In the manufacturing process according to the present invention, the metallic base layer and/pr the ferromagnetic layer is formed on the substrate body at 60 ° C.–150° C.

9 Claims, 10 Drawing Sheets

3 nm 3 nm (a)

(b)

MAGNETIC RECORDING MEDIUM AND METHOD OF MANUFACTURING THE SAME

TECHNICAL FIELD

The present invention relates to a magnetic recording medium and a method of manufacturing the magnetic recording medium. More particularly, the present invention relates to a high density magnetic recording medium which has a high coercive force and a high normalized coercive force and which is excellent in an S/N ratio and a method of manufacturing the high density magnetic recording medium. The magnetic recording medium of the present invention is preferably used in a hard disk, a floppy disk, a magnetic tape or the like.

BACKGROUND ART

The following technology has been known in respect of a conventional magnetic recording medium and a method of manufacturing thereof.

FIG. 10 is an outline views for explaining a hard disk as an example of a magnetic recording medium. In FIG. 10, FIG. 10(a) is a perspective view showing a total of a magnetic recording medium and FIG. 10(b) is a sectional view taken from a line A—A' of FIG. 10(a).

A substrate body 1 where a nonmagnetic (Ni(nickel)-P (phosphor)) layer 3 is provided on the surface of an Al(aluminum) substrate 2 is used. Further, on top of the substrate 1, a Cr (chromium) base layer 4, a ferromagnetic metal layer 5 and a protective layer 6 are laminated in this order.

The substrate body 1 is constructed in which the nonmagnetic (Ni—P) layer 3 is formed on the surface of the Al substrate 2 in a disk shape having a diameter of 89 mm (3.5 inch) and a thickness of 1.27 mm (50 mil) by a plating process or a sputtering process. Further, inscriptions (hereinafter, referred to as texture) in concentric shapes are provided on the surface of the nonmagnetic (Ni—P) layer 3 by mechanical polishing. Generally, the surface roughness, that is, the mean center line roughness Ra which is measured in the radial direction is 5 nm through 15 nm. Further, the Cr base layer 4 and the ferromagnetic metal layer 5 (generally, a magnetic film of Co (cobalt) alloy group), are formed on the surface of the substrate body 1 by a sputtering process and finally, the protective layer 6 comprising carbon or the like is provided by a sputtering process to protect the surface of the ferromagnetic metal layer 5. Typical thicknesses of the respective layers are, 5 $\mu$m through 15 $\mu$m for the nonmagnetic (Ni—P) layer 3, 50 nm through 150 nm for the Cr base metal layer 4, 30 nm through 100 nm for the ferromagnetic metal layer 5 and 20 nm through 50 nm for the protective layer 6.

The conventional magnetic recording medium having the above-described layer structure is fabricated under conditions of a back pressure at the order of $10^{-7}$ Torr of a film forming chamber before film formation by sputtering and an impurity concentration of 1 ppm or more of Ar (argon) gas used in the film formation.

It has been reported by Nakai et al. that according to the magnetic recording medium provided by the above-described fabrication process, especially in the case of the ferromagnetic metal layer 5 including Ta (tantalum) element (for example, CoCrTa alloy magnetic film), grain boundaries constructed of an amorphous structure are present among crystal grains forming the ferromagnetic metal layer and the grain boundaries comprise a nonmagnetic alloy composition (J. Nakai, E. Kusumoto, M. Kuwabara, T. Miyamoto, M. R. Visokay, K. Yoshikawa and K. Itayama, "Relation Between Microstructure of Grain Boundary and the Intergranular Exchange in CoCrTa Thin Film for Longitudinal Recording Media", IEEE Trans. Magn., vol. 30, No. 6, pp. 3969, 1994).

However, in the case of the ferromagnetic metal layer that does not include Ta element (for example, CoNiCr (chromium) or CoCrPt (platinum) alloy magnetic film), the above-described grain boundaries have not been confirmed.

Further, it has been described that when the ferromagnetic metal layer includes Ta element, the normalized coercive force (designated as Hc/Hkgrain) is provided with a value as large as 0.3 or more whereas it has a value smaller than 0.3 when the ferromagnetic metal layer does not include Ta element.

Further, International Application Publication No. PCT/JP94/01184 discloses a technology where in magnetic recording medium utilizing magnetic inversion in which a ferromagnetic metal layer is formed on the surface of a substrate body via a metallic base layer as an inexpensive high density recording medium having an increased coercive force without using an expensive ferromagnetic metal layer and a method of manufacturing thereof, an oxygen concentration of the metallic base layer and/or the ferromagnetic metal layer is decreased to 100 wtppm or below by decreasing an impurity concentration of Ar gases in film formation down to 10 ppb or below. Further, it has been reported that the coercive force is further increased by removing the surface of the substrate body by 0.2 nm through 1 nm by carrying out a cleaning treatment on the surface of the substrate body through a high frequency sputtering process by using Ar gas having an impurity concentration of 10 ppb or below before forming the metallic base layer. According to the report, it has been described that there is a correlation between a normalized coercive force and medium noise in a magnetic recording medium and the normalized coercive force should be 0.3 or more and lower than 0.5 to provide a low noise medium.

The normalized coercive force (Hc/Hkgrain) of a ferromagnetic metal layer is a value of a coercive force Hc divided by an anisotropic magnetic field Hkgrain of crystal grains, which represents a degree of enhancing magnetic isolation of crystal grains. That is, a high normalized coercive force of a ferromagnetic metal layer signifies that magnetic interaction of individual crystal grains constituting the ferromagnetic metal layer is lowered and a high coercive force can be realized.

Also, it has been known that a transitional region of magnetic inversion constitutes a noise source in respect of recording signals when a further high frequency recording is carried out in order to achieve high recording density. That is to say, when disturbance of the transitional region is large or when disturbance is caused in a wide range, there is a strong tendency of increasing noise whereby a magnetic recording medium having poor recording and reproducing property is formed.

In current magnetic recording media, certainly, a low noise medium is apt to be provided when the ferromagnetic metal layer is constituted by a CoCrTa alloy magnetic film and noise is apt to be enhanced when it is constituted by a CoNiCr or CoCrPt alloy magnetic film.

Meanwhile, with respect to a magnetic recording medium having a ferromagnetic metal layer comprising a CoCrTa alloy magnetic film, it is difficult to fabricate stably a medium having a high coercive force in mass production since the film is liable to suffer influence of an atmosphere of film formation. By contrast, a CoNiCr or CoCrPt alloy magnetic film has an advantage that the coercive force in mass production is obtained comparatively stably.

Accordingly, in respect of the magnetic recording medium having the ferromagnetic metal layer comprising a CoNiCr or CoCrPt alloy magnetic film whereby the coercive force in mass production can be obtained comparatively stably, a magnetic recording medium having a property of a high S/N ratio (recording signal S, medium noise N) in the electromagnetic conversion property and a method of fabricating thereof have been desired to realize.

It is a first object of the present invention to provide a magnetic recording medium in which in respect of a magnetic recording medium having a ferromagnetic metal layer comprising a CoNiCr or CoCrPt alloy magnetic film, the S/N ratio (recording signal S, medium noise N) of the electromagnetic conversion property is high and the coercive force in mass production can stably be obtained.

Further, it is a second object of the present invention to provide a method of manufacturing a magnetic recording medium capable of easily forming a medium having a coercive force with low surface temperature of a substrate body during a film formation, and also with no electric bias application with respect to a substrate body.

DISCLOSURE OF THE INVENTION

A magnetic recording medium according to the present invention is characterized in that in a magnetic recording medium where a ferromagnetic metal layer comprising at least CoNiCr is formed on a surface of a substrate body via a metallic base layer and an oxygen concentration of the ferromagnetic metal layer is 100 wtppm or lower and which utilizes magnetic inversion, crystal grains forming the ferromagnetic metal layer are provided with grain boundaries comprising an amorphous structure at least among the crystal grains.

Further, a magnetic recording medium according to the present invention is characterized in that in a magnetic recording medium where a ferromagnetic metal layer comprising at least CoCrPt is formed on a surface of a substrate body via a metallic base layer and an oxygen concentration of the ferromagnetic metal layer is 100 wtppm or lower and which utilizes magnetic inversion, crystal grains forming the ferromagnetic metal layer are provided with grain boundaries comprising an amorphous structure at least among the crystal grains.

Further, the magnetic recording medium according to the present invention is characterized in that the grain boundaries are nonmagnetic and the ferromagnetic metal layer includes Ta(tantalum) as a fourth element.

Still further, the magnetic recording medium according to the present invention is characterized in that the metallic base layer is made of Cr (chromium) and a film thickness of the metallic base layer is 5 nm through 30 nm.

Other than the above-described magnetic recording media, the magnetic recording medium according to the present invention is characterized in that the ferromagnetic metal layer is formed on the surface of the substrate body without interposing the metallic base layer.

A method of manufacturing a magnetic recording medium according to the present invention is characterized in that in a method of manufacturing a magnetic recording medium where a method of forming the metallic base layer and/or the ferromagnetic metal layer is a sputtering film forming process, a temperature on the surface of the substrate body in forming the metallic base layer and/or the ferromagnetic metal layer is 60° C. through 150° C.

Further, the method of manufacturing a magnetic recording medium according to the present invention is also characterized in that in forming the metallic base layer and/or the ferromagnetic metal layer, an electric bias is not applied to the substrate body other than a self bias caused by a plasma. Function According to the invention in accordance with claim 1, the grain boundaries comprising an amorphous structure are present among the crystal grains forming the ferromagnetic metal layer in the longitudinal magnetic recording medium having the ferromagnetic metal layer comprising CoNiCr, and accordingly, a high coercive force, a high normalized coercive force and an excellent S/N characteristic can be realized.

According to the invention in accordance with claim 2, the grain boundaries comprising an amorphous structure are present among the crystal grains forming the ferromagnetic metal layer in the longitudinal magnetic recording medium having the ferromagnetic metal layer comprising CoCrPt, and accordingly, a high coercive force, a high normalized coercive force and an excellent S/N characteristic can be realized.

According to the invention in accordance with claim 3, regions among the respective crystal grains each constituting a small magnet, can be prevented from being brought into a magnetically disturbed state since the boundary grains are nonmagnetic. As a result, transitional regions which are to constitute a noise source can be reduced in carrying out magnetic recording by magnetic inversion.

According to the invention in accordance with claim 4, the ferromagnetic metal layer includes Ta as the fourth element and accordingly, further larger grain boundary regions can be formed.

According to the invention in accordance with claim 5, formation of the grain boundaries is expedited by the metallic base layer made of Cr.

According to the invention in accordance with claim 6, the crystal grains of the ferromagnetic metal layer can be made small by making the film thickness of the metallic base layer set to 5 nm through 30 nm. As a result, the medium noise in recording and reproducing can be made small.

According to the invention in accordance with claim 7, the magnetic recording medium corresponding to perpendicular magnetic recording and having an excellent S/N characteristic can be obtained.

According to the invention in accordance with claim 8, the film formation of the magnetic recording medium can be carried out at a low temperature and accordingly, a gas emission amount in a film forming chamber can be reduced and plastics or the like vulnerable to heating at high temperatures can be used as a material of the substrate body.

According to the invention in accordance with claim 9, the electric bias is not applied on the substrate body other than the self bias caused by a plasma and accordingly, a gas emission amount in the atmosphere of the substrate body in the film forming operation can be reduced. Further, film exfoliation from a jig or the like for holding the substrate body can be reduced.

EMBODIMENTS MODES

An explanation will be given of embodiment Modes of the present invention as follows.

Substrate Body

As substrate bodies in the present invention, there are, for example, substrate bodies, made of aluminum, titanium and alloys of these, silicon, glass, carbon, ceramic, plastic, resin and composites of these and the above-mentioned materials where a surface coating treatment is carried out with nonmagnetic films of different materials on surfaces thereof by a sputtering process, a vapor deposition process, a plating process or the like. It is preferable that the nonmagnetic films provided on the surfaces of the substrate bodies are not magnetized at high temperatures, provided with conductivity and easy to be subjected to machining and on the other hand, provided with pertinent surface hardnesses. As a nonmagnetic film satisfying these conditions, a (Ni—P) film fabricated by a sputtering process is especially preferable.

A donut disk shape is used as the shape of the substrate body when it is used for a disk. A substrate body provided with a magnetic layer or the like, mentioned later, that is, a magnetic recording medium is used by being rotated at a speed of, for example, 3600 rpm with the center of a disk as an axis in magnetic recording and reproducing. In this case, a magnetic head flies at a height of substantially 0.1 $\mu$m above the magnetic recording medium. Therefore, it is necessary for the substrate body to pertinently control the flatness of the surface, the parallelism between the surface and the rear face, the waviness in the circumferential direction of the substrate body and the roughness of the surface. Further, when the substrate body is rotated or stopped, the surfaces of the magnetic recording medium and the magnetic head are bought into contact with each other and abrasively moved (Contact Start Stop, referred to as CSS). As a measure therefor, concentric slight inscriptions (texture) may be provided on the surface of the substrate body.

Metallic Base Layer

As metallic base layers in the present invention, there are layers made of, for example, Cr, Ti, W(tungsten) and alloys of these. When the layer is made of an alloy, combinations of the above-described metals with V(vanadium), Nb(niobium), Ta or the like have been proposed. Cr is especially preferable since it causes segregation in respect of a ferromagnetic metal layer, mentioned later. These metals are frequently used in mass production and a sputtering process, a vapor deposition process or the like is used as a film forming method.

The role of the metallic base layer is to expedite crystal growth of a ferromagnetic metal layer such that the direction of easy magnetization of the ferromagnetic metal layer is in an in-plane direction of the face of the substrate, that is, the coercive force in the in-plane direction of the substrate is enhanced when a ferromagnetic metal layer comprising Co base is provided thereon.

When a metallic base layer comprising Cr is fabricated by a sputtering process, as factors of film formation for controlling the crystalline performance, there are surface shape, surface condition or surface temperature of a substrate body, gas pressure in film formation, a bias applied on a substrate, a thickness of a formed film and the like. Especially, the coercive force of a ferromagnetic metal layer has a tendency where it is increased in proportion to the film thickness of Cr and accordingly, in the conventional technology, the film thickness of Cr uses in a range of, for example, 50 nm through 150 nm.

Here, conventional film forming conditions (film forming condition of the present invention) signify that the back pressure of a film forming chamber is in the order of $10^{-7}$ ($10^{-9}$) Torr and an impurity concentration of Ar gas used in the film formation is in a range of 1 ppm or higher (100 ppt or lower, preferably 10 ppb or lower). The impurity concentration of a target used in forming a metallic base layer preferably falls in a range of 150 ppm or below.

In order to promote the recording density, the fly height of the magnetic head from a surface of a medium is to be decreased. On the other hand, when the thickness of a Cr film is large, the surface roughness of a medium is liable to increase. Therefore, it has been desired to realize a high coercive force with a thin thickness of a Cr film.

Ferromagnetic Metal Layer

There are two kinds of ferromagnetic metal layers according to the present invention as follows.

There are, for example, CoNiCr, CoCrTa, CoCrPt, CoNiPt, CoNiCrTa, CoCrPtTa and the like as the first kind of these which adapt to the case where they are provided on the surface of a substrate body via a metallic base layer (that is, the case of a magnetic film for in-plane recording).

CoNiCr and CoCrPt which are material systems having no grain boundaries comprising an amorphous structure among crystal grains under conventional film forming conditions, are preferably used in the present invention. However, it has been confirmed that when film forming conditions of the present invention are used, grain boundaries can further be controlled even with other material systems (for example, CoCrTa group or CoNiPt group) having somewhat grain boundaries even under conventional film forming conditions.

Here, conventional film forming conditions (film forming conditions of the present invention) signify that the back pressure of a film forming chamber is in the order of $10^{-7}$ ($10^{-9}$) Torr and an impurity concentration of Ar gas used in film formation is in a range of 1 ppm or more (100 ppt or lower, preferably 10 ppb or lower). Further, an impurity concentration of a target used in forming a ferromagnetic metal layer is preferably in a range of 30 ppm or lower.

Among the ferromagnetic metal layers belonging to the first kind, CoNiCr is preferably used since it is inexpensive and difficult to receive influence of atmosphere in film formation, CoCrTa is preferably used since medium noise is low and CoPt(platinum) group is preferably used to realize a coercive force of 1800 Oe or more that is difficult to achieve by CoNiCr or CoCrTa.

The problem in the first kind is to develop a material and a method of fabrication in which material cost is inexpensive, medium noise is low and a high coercive force can be realized in order to promote record density and reduce fabrication cost.

As a second kind, there are, for example, CoCr, CoPt, CoCrTa and the like which are adaptable to the case where they are directly provided on the surface of a substrate without interposing a metallic base layer (that is, the case of a magnetic film for perpendicular recording). Further, a soft magnetic metal layer may be provided under these ferromagnetic metal layers as a backing layer.

It has been confirmed that grain boundaries can further be controlled in these material systems having somewhat grain boundaries even under conventional film forming conditions when film forming conditions of the present invention are used.

The problem in the second kind is to develop a material and a fabrication method capable of maintaining a high coercive force in a direction perpendicular to a film face even if the film thickness of a ferromagnetic metal layer is thinned.

Magnetic Recording Medium Utilizing Magnetic Inversion

There are two kinds of "magnetic recording media comprising magnetic inversion" according to the present invention, namely, a medium (longitudinal magnetic recording medium) conducting recording magnetization in parallel to a film face of the above-described ferromagnetic metal layer and a medium (perpendicular magnetic recording medium) conducting a recording magnetization orthogonally thereto.

Further downsizing of recording magnetization must be achieved in either of the media to promote recording density. The downsizing reduces leakage magnetic flux of the respective recording magnetization and therefore, an output of reproducing signal at a magnetic head is decreased. Accordingly, it has been desired to further reduce the medium noise which seems to be caused by an influence of contiguous recording magnetization.

Oxygen Concentration of a Ferromagnetic Metal Layer

It is known that the "oxygen concentration of a ferromagnetic metal layer" according to the present invention is in a range of 250 wtppm or higher in the case of a CoNiCr film fabricated by a conventional sputtering process. It has been desired to investigate on an influence of the oxygen concentration of a ferromagnetic metal layer, that is, an influence effected on a coercive force of a medium or medium noise.

By the above-described conventional sputtering process, film formation is conducted under conditions of an ultimate vacuum degree in a film forming chamber for forming a ferromagnetic metal layer in the order of $10^{-7}$ Torr and an impurity concentration of Ar gas used in forming the ferromagnetic metal layer in a range of 1 ppm or higher.

Oxygen Concentration of a Metallic Base Layer

It is known that the "oxygen concentration of a metallic base layer" according to the present invention is in a range of 250 wtppm or higher in the case of a Cr film fabricated, for example, by the conventional sputtering process. It has been desired to investigate on an influence of the oxygen concentration of a metallic base layer, that is, an influence on a crystal growth procedure depending on a film thickness of the metallic base layer, an influence on a ferromagnetic metal layer formed on the metallic base layer and the like.

The above-described conventional sputtering process is the same as explained on the item of the "oxygen concentration of a ferromagnetic metal layer".

Normalized Coercive Force (designated $Hc/Hk^{grain}$) of a Ferromagnetic Metal Layer It has been shown that the "normalized coercive force of a ferromagnetic metal layer" according to the present invention is a value of a coercive force Hc divided by an anisotropic magnetic field $Hk^{grain}$ of crystal grain and signifies a degree of promoting magnetic isolation of crystal grains by "Magnetization Reversal Mechanism Evaluated by Rotational Hysteresis Loss Analysis for the Thin Film Media" Migaku Takahashi, T. Shimatsu, M. Suekane, M. Miyamura, K. Yamaguchi and H. Yamasaki: IEEE Transactions on MAGNETICS, vol. 28, 1992, pp. 3285.

A normalized coercive force of a ferromagnetic metal layer fabricated by a conventional sputtering process has a value smaller than 0.3 so far as the ferromagnetic metal layer comprises Co base. According to Stoner-Wohlfarth theory, when crystal grains are completely magnetically isolated, the normalized coercive force takes a value of 0.5 and the value is an upper limit value of the normalized coercive force.

Further, according to J. G. Zhu and H. N. Bertram: Journal of Applied Physics, vol 63, 1988, pp. 3248, it is described that by increasing a normalized coercive force of a ferromagnetic metal layer, magnetic interaction among individual crystal grains constituting the ferromagnetic metal layer is lowered whereby a high coercive force can be realized.

Here, the coercive force Hc signifies a resistant magnetic force of a medium provided from a magnetization curve that is measured by using a vibrated sample type magnetic force meter (Variable Sample Magnetometer, referred to as VSM). The anisotropic magnetic field $Hk^{grain}$ of crystal grains signifies an applied magnetic field whereby the rotational hysteresis loss measured by a high sensitivity torque magnetic force meter is completely nullified. Both coercive force and anisotropic magnetic field are values measured in the face of a thin film in the case of a magnetic recording medium where a ferromagnetic metal layer is formed on the surface of a substrate body via a metallic base layer and are values measured in a direction perpendicular to the face of the thin film in the case of a magnetic recording medium where a ferromagnetic metal layer is formed on the surface of a substrate body.

Aluminum Alloy

There is an alloy comprising, for example, aluminum and magnesium as an aluminum alloy according to the present invention. Currently, a substrate body made of an aluminum alloy is mostly used for the use of a HD (hard disk). It is preferable that the content of metal oxides is as small as possible since the object of use is for magnetic recording.

Further, a (Ni—P) film which is nonmagnetic is frequently provided on the surface of an aluminum alloy by a plating process or a sputtering process. The object of provision is promotion of corrosion resistance and increase of surface hardness of a substrate body. Concentric slight inscriptions (texture) are provided on the surface of the (Ni—P) film to reduce a frictional force when a magnetic head abrasively moves on the surface of a medium.

The problem in the case where a substrate body is made of an aluminum alloy is to thin the substrate body and to reduce the surface roughness of the substrate body. Currently, the former has a limit of 0.5 mm and the latter has a limit of substantially 0.5 nm.

Glass

There are, for example, glass strengthened by conducting ion doping with respect to the surface of the glass, glass comprising a structure where the glass per se is finely crystallized and the like as glass according to the present invention. Both kinds of glass are devised to resolve the drawback of glass, that is, "easy to crack".

Glass is excellent in that the (Ni—P) film or the like is not necessary to provide since the surface hardness is higher than that of an aluminum alloy. It also is advantageous in view of thinning of a substrate body, smoothness of the surface of a substrate body, high temperature resistance property of a substrate body.

However, a nonmagnetic layer may be provided on the surface of glass since it is preferable to conduct film formation by elevating the surface temperature of a substrate body in film formation and while applying a bias on the substrate body in order to fabricate a magnetic film having a high coercive force. Also, a nonmagnetic layer may be arranged in order to prevent harmful elements from invading from glass to a magnetic film. Or, a nonmagnetic layer having fine irregularities may be arranged on the surface of glass to reduce a frictional force that is caused when a magnetic head abrasively moves on a surface of the medium.

The problem in the case where a substrate body is constructed of glass is to achieve a compatibility of thinning the substrate body and a technology of preventing the substrate body from cracking.

Silicon

There is, for example, a silicon wafer in a disk-like shape which has achievements in the semiconductor field in respect of silicon according to the present invention.

Similar to glass, silicon is more excellent than an aluminum alloy in view of the facts that the surface hardness is high, the substrate body can be thinned, the smoothness of the surface of the substrate body is high and high temperature resistance property of the substrate body is superior. In addition thereto, it has been expected that the control ability of crystal growth of a magnetic film formed on the surface of the substrate body is promoted since the crystal orientation or the lattice constant of the surface of the substrate body can be selected. Further, it is advantageous in view of the facts that bias application is feasible on the substrate body similar to an aluminum alloy since the substrate body is conductive and further cleaning of a film forming space can be achieved because emission of gasses such as $H_2O$ or the like is small from the inside of the substrate body.

The problem in the case where a substrate body is made of silicon is to achieve a compatibility of thinning a substrate body and a technology of preventing the substrate body from cracking similar to those in glass.

Sputtering Process

There are, for example, a transfer type where a thin film is formed by moving a substrate body in front of a target and a stationary type where a thin film is formed by fixing a substrate body in front of a target as sputtering processes according to the present invention. The former is advantageous in fabrication of a medium having a low cost since mass production performance is superior and the latter can fabricate a medium excellent in recording and reproducing characteristics since an incident angle of sputtering particles in respect of a substrate body is stable.

Successive Formation of a Metallic Base Layer and a Ferromagnetic Metal Layer)

The "successive formation of a metallic base layer and a ferromagnetic metal layer" according to the present invention signifies that "in a time period from when a metallic base layer is formed on the surface of a substrate body to when a ferromagnetic metal layer is formed on the surface thereof, the material is not exposed in an atmosphere having a pressure higher than a gas pressure in film formation." It is publicly-known that when the surface of a metallic base layer is exposed in the atmosphere and thereafter, a ferromagnetic metal layer is formed thereon, the coercive force of a medium is significantly lowered (for example, with no exposure: 1500 Oe→with exposure: 500 Oe or lower).

Impurities and Their Concentrations of Ar Gas Used in Film Formation

There are, for example, $H_2O$, $O_2$, $CO_2$, $H_2$, $N_2$, $C_xH_y$, H, C, O, CO and the like as the impurities of Ar gas used in film formation, according to the present invention. It is estimated that the impurities particularly influencing on the oxygen amount included in a film are $H_2O$, $O_2$, $CO_2$, O, CO. Accordingly, the impurity concentration according to the present invention is represented by a sum of $H_2O$, $O_2$, $CO_2$, O and CO included in Ar gas used in film formation.

Cleaning by a High Frequency Sputtering Process

There is, for example, a method where an alternating current voltage is applied from an RF (radio frequency, 13.56 MHz) power source to a substrate body placed in a space having a gas pressure whereby discharge can be conducted as the "cleaning by a high frequency sputtering process" according to the present invention. The feature of this method resides in that it is applicable also in the case where a substrate body is not conductive. Promotion of adhesiveness of a thin film in respect of a substrate body is generally pointed out as an effect of cleaning. However, there are many unknown points in respect of an influence effected on a quality of a thin film per se formed on the surface of a substrate body after cleaning.

Impurities of a Cr Target and Their Concentrations Used in Forming a Metallic Base Layer There are, for example, Fe, Si, Al, C, O, N, H and the like as "impurities of a Cr target used in forming a metallic base layer". It is estimated that an impurity particularly influencing on an oxygen amount included in a film is O. Accordingly, the impurity concentration according to the present invention signifies that of oxygen included in a Cr target used in forming a metallic base layer.

Impurities of a Target Used in Forming a Ferromagnetic Metal Layer and Their Concentrations There are, for example, Fe, Si, Al, C, O, N and the like as the "impurities of a Co base target used in forming a ferromagnetic metal layer" according to the present invention. It is estimated that an impurity particularly influencing on an oxygen amount included in a film is O. Accordingly, the impurity concentration according to the present invention indicates that of oxygen included in the target used in forming a ferromagnetic metal layer.

Negative Bias Application on a Substrate Body

"Negative bias application on a substrate body" according to the present invention signifies that a direct current bias voltage is applied on a substrate body when a Cr base film or a magnetic film is formed for a magnetic recording medium. It is known that when pertinent bias voltage is applied, the coercive force of a medium is increased. It is publicly-known that the effect of the above-described bias application is larger in the case where it is applied on both of the layers than in the case where it is applied when either one of the films is fabricated.

However, the above-described bias application is frequent operated also on objects in the vicinity of a substrate body, that is, a substrate body support member and a substrate body holder. As a result, an inconvenient state where gas or dust is generated in a space at the vicinity of a substrate body, these are included in a thin film in film formation and accordingly, the characteristics of various films become unstable, is liable to cause.

Further, bias application on a substrate body involves the following problems.

(1) It is not applicable to a nonconductive substrate body such as glass.

(2) A saturated magnetic flux density (Ms) of a formed magnetic film is lowered.

(3) A complicated mechanism must be provided in a film forming chamber.

(4) The degree of bias application on a substrate body is liable to change and as a result, a dispersion is liable to cause in the magnetic property.

Accordingly, a method of fabrication capable of providing various aimed film properties without conducting the above-described bias application, has been desired.

Ultimate Vacuum Degree of a Film Forming Chamber for Forming a Metallic Base Layer and/or a Ferromagnetic Metal Layer "The ultimate vacuum degree of a film forming chamber for forming a metallic base layer and/or a ferromagnetic metal layer" according to the present invention is one of factors in film forming controlling the value of the coercive force depending on the material of a ferromagnetic metal layer. Especially, it has been conventionally considered that with respect to a martial of Co base including Ta in a ferromagnetic metal layer, the influence is significant in the case where the ultimate vacuum degree is low (for example, $5\times10^{-6}$ Torr or more). However, according to the present invention, it is known that the ultimate vacuum degree of a film forming chamber is effective in view of whether grain boundaries comprising an amorphous structure can be formed among crystal grains even with CoNiCr or CoCrPt that is a material of Co base that does not include Ta.

Surface Temperature of a Substrate Body in Forming a Metallic Base Layer and/or a Ferromagnetic Metal Layer The "surface temperature of a substrate body in forming a metallic base layer and/or a ferromagnetic metal layer" according to the present invention is one of factors in film formation controlling the value of the coercive force without depending on the material of a ferromagnetic metal layer. A high coercive force can be realized when film formation is conducted at a high surface temperature so far as it is in a range where a substrate body is not damaged. The damage of a substrate body signifies an external change such as warping, bulging, cracking or the like or an internal change such as magnetization, an increase in gas emission amount or the like.

However, to realize a high surface temperature of a substrate body, some heating treatment must generally be performed at a film forming chamber or a chamber in front thereof. The heating treatment involves an inconvenient aspect where gas or dust is generated in a space at the vicinity of a substrate body and these are included in a thin film in film formation whereby various film characteristics become unstable.

There are following problems with respect to high surface temperature of a substrate body.

(1) A nonmagnetic NiP layer in a substrate body of NiP/Al is magnetized.

(2) Warping is caused in a substrate body.

(3) It is difficult to elevate or hold a substrate body temperature in respect of a substrate body having low thermal conductivity such as glass.

Accordingly, a method of fabrication capable of obtaining various target film characteristics even in the case where the above-described heating treatment is not performed or even with a low temperature heating treatment.

Surface Roughness of a Substrate Body, Ra

There is, for example, the mean center line roughness Ra in the case where the surface of a substrate body having a disk-like shape is measured in a radial direction as a surface roughness of a substrate body according to the present invention. TALYSTEP made by RANKTAYLORHOBSON Co., Ltd. was used as a measuring instrument.

Surfaces of a magnetic recording medium and a magnetic head are brought into contact with each other and abrasively moved in the case where a rotation of a substrate body is started from a stationary state or vice versa (Contact Start Stop, referred to as CSS).

In this case, it is preferable that Ra is large to prevent adhesion of the magnetic head or an increase in a frictional coefficient. Meanwhile, it is preferable that Ra is small since a distance between a magnetic recording medium and a magnetic head, that is, a fly height of a magnetic head must be secured when rotation of a substrate body reaches the maximum rotational number.

Accordingly, the surface roughness of a substrate body or the maximum value and the minimum value of Ra are pertinently determined from the above-described reason and a specification required for a magnetic recording medium.

For example, when the fly height of a magnetic head is 2 $\mu$inch, Ra=6 nm through 8 nm.

However, to achieve a higher recording density, the fly height of the magnetic head (a distance of a magnetic head apart from the surface of a magnetic recording medium in carrying out recording and reproducing operation) must further be decreased. To meet the request, it is important to further flatten the surface of a magnetic recording medium. It is preferable from this reason that the surface roughness of a substrate body is further decreased.

Accordingly, a method of fabrication capable of obtaining various aimed film characteristics even in the case where the surface roughness of a substrate body is smaller, has been desired.

Texturing

There are, for example, a method by mechanical polishing, a method by chemical etching, a method by providing a physically irregular film and the like as texturing according to the present invention. Especially, the method by mechanical polishing is adopted when a substrate body of a magnetic recording medium is an aluminum alloy substrate body that is most widely used. For example, there is a method for attaching concentric slight inscriptions where a tape adhered with polishing grits on its surface is pushed onto a rotating substrate body in respect of a (Ni—P) film provided on the surface of an aluminum alloy substrate body. According to this method, the polishing grits may be used by separating them from the tape.

However, a method of fabrication capable of obtaining various aimed film characteristics even in the case where the texturing is not conducted or even with a further slight texture shape due to the reason mentioned in the item of "surface roughness of a substrate body".

Composite Electrolytic Polishing

There is, for example, a treatment of providing a passivated oxide film comprising chromium oxides to an inner wall of a vacuum chamber used in forming a magnetic film or the like as composite electrolytic polishing according to the present invention. In this case, for example, SUS 316L or the like is preferable as a material constituting the inner wall of the vacuum chamber. The emission amounts of $O_2$ and $H_2O$ from the inner wall of the vacuum chamber can be reduced by this treatment and accordingly, an amount of oxygen included in a fabricated thin film can further be reduced.

By using a magnetron sputtering apparatus (type number ILC3013: load lock type stationary opposed type) made by Anelba Co. Ltd. which has been used in the present invention, the above-described treatment is carried out on inner walls of all the vacuum chamber (loading/unloading chambers, film forming chambers, cleaning chambers).

Explanation of Reference Numerals

Figure 1:
FIG. 1 is a transmission electron microscope (TEM) photograph of Sample 1 according to Embodiment 1.

1 Substrate body
2 Al substrate
3 Nonmagnetic (Ni—P) layer
4 Cr base layer
5 Ferromagnetic metal layer
6 Protective film
41 Upper magnetic pole
42 Lower magnetic pole
43 Write coil
44 Write gap
45 Shield
46 MR constituting portion
47 Read gap

BEST MODE FOR CARRYING OUT THE INVENTION

Although a detailed explanation will be given of the present invention by showing embodiments as follows, the present invention is not limited to the embodiments.

Embodiment 1

In this example, an effect derived from the fact that crystal grains forming a ferromagnetic metal layer are provided with crystal grains comprising an amorphous structure at least between the crystal grains will be shown.

In order to confirm the effect, the ultimate vacuum degree of a film forming chamber for forming a metallic base layer was changed. The ultimate vacuum degree of a film forming chamber for forming a metallic base layer were provided with two values in the order of $10^{-9}$ Torr and in the order of $10^{-7}$ Torr.

In this case, a concentration of an impurity included in Ar gas in forming a ferromagnetic metal layer and a metallic base layer was fixed to 10 ppb and the ultimate vacuum degree of a film forming chamber for forming the ferromagnetic metal layer was fixed to the order of $10^{-9}$ Torr.

A sputtering apparatus used in fabricating a medium in this example was a magnetron sputtering apparatus (type number ILC3013: load lock type stationary opposed type) made by Anelba Co., Ltd. and inner walls of all the vacuum chambers (loading/unloading chambers (which also served as cleaning chambers), a film forming chamber 1 (for forming the metallic base layer), a film forming chamber 2 (for forming the ferromagnetic metal layer) and a film forming chamber 3 (for forming a protective layer)) were subjected to a composite electrolytic polishing. Table 1 shows film forming conditions in fabricating a magnetic recording medium according to the example.

TABLE 1

| Item | Set value |
| --- | --- |
| (1) Material of substrate body | Al-Mg alloy (with (Ni-P) plating film having a thickness of 10 μm) |
| (2) Diameter and shape of substrate body | 89 mm, disk shape |
| (3) Surface shape of substrate body | With texture, Ra <1 nm |
| (4) Ultimate vacuum degree (Torr) | $10^{-7}$ or $10^{-9}$ (film forming chamber 1) $5 \times 10^{-9}$ (other than film forming chamber 1) |
| (5) Concentration of impurity in Ar gas | 10 ppb (all the chambers) |
| (6) Ar gas pressure (mTorr) | 2 (all the chambers) |
| (7) Hold temperature of surface of substrate body (C) | 230 (all the chambers) |
| (8) Material of target (at %) | Cr, $Co_{62.5}Ni_{30}Cr_{7.5}$, C |
| (9) Diameter of target (inch) | 6 |
| (10) Concentration of impurity in target (ppm) | 120 (Cr), 20 (CoNiCr) |
| (11) Interval between target and substrate body (mm) | 35 (Cr, CoNiCr, C) |
| (12) Power inputted to target (W) | Direct current 200 (Cr, CoNiCr) Direct current 400 (C) |
| (13) Direct current bias applied on substrate body in film formation (-Volt) | 200 (Cr, CoNiCr) 0 (C) |
| (14) Formed film thickness (nm) | 50 (Cr), 15 (CoNiCr), 10 (C) |

An explanation will be given of a method for fabricating magnetic recording media according to the example in due order of process. The following bracketed numbers represent the order of process.

(1) An aluminum alloy substrate in a disk-like shape having inner/outer diameters of 25 mm/89 mm and a thickness of 1.27 mm was used as a substrate body. A (Ni—P) film having a thickness of 10 μm was provided by plating on the surface of the aluminum alloy substrate. Concentric slight inscriptions (texture) were attached on the surface of the (Ni—P) film by a mechanical means and with respect to the surface roughness of the substrate body in scanning in the radial direction of the disk, the mean center line roughness Ra was smaller than 1 nm.

(2) The substrate body was subjected to cleaning by mechanical and chemical means and drying by hot air or the like before film formation, mentioned later.

(3) The substrate body which had been subjected to drying was set to a substrate body holder made of aluminum that was arranged in a loading chamber of a sputtering apparatus. After exhausting the inside of the unloading chamber to the ultimate vacuum degree of $3 \times 10^{-9}$ Torr by a vacuuming apparatus, the substrate body was heated at 250° C. for 5 minutes by using an infrared ray lamp.

(4) The substrate body holder was moved from the loading chamber to a film forming chamber 1 for forming a Cr film. The substrate body was heated and held at 250° C. by an infrared ray lamp even after the movement. Incidentally, the film forming chamber 1 was used after exhausting it to the ultimate vacuum degree of $1 \times 10^{-7}$ Torr or $3\times10^{-9}$ Torr before the film forming operation. After moving the substrate body holder, a door valve between the loading chamber and the film forming chamber 1 was closed. A concentration of an impurity of a Cr target used was 120 ppm.

(5) Ar gas was introduced into the film forming chamber 1 and the gas pressure of the film forming chamber 1 was set to 2 mTorr. The concentration of an impurity included in Ar gas used was fixed to 10 ppb.

(6) A plasma was generated by applying a voltage of 200 W from a direct current power source to the Cr target. As a result, the Cr target was sputtered whereby a Cr layer having a film thickness of 50 nm was formed on the surface of the substrate body at a position opposed to and in parallel with the target.

(7) After forming the Cr layer, the substrate body holder was moved from the film forming chamber 1 to a film forming chamber 2 for forming a CoNiCr film. Even after the movement the substrate body was heated and held at 250° C. by an infrared ray lamp. Incidentally, the ultimate vacuum degree of the film forming chamber 2 before operation was achieved by changing conditions. The set conditions were two conditions in the case of exhausting down to $3\times10^{-9}$ Torr and in the case of exhausting down to $1\times10^{-7}$ Torr. Further, a door valve disposed between the film forming chamber 1 and the film forming chamber 2 was closed after the movement of the substrate body holder. The composition of a used target was 62.5 at % Co, 30 at % Ni and 7.5 at % Cr and a concentration of an impurity of a target was 20 ppm.

(8) Ar gas was introduced into the film forming chamber 2 and the gas pressure of the film forming chamber 2 was set to 2 mTorr. A concentration of an impurity included in used Ar gas was fixed to 10 ppb.

(9) A plasma was generated by applying a voltage of 200 W from a direct current power source to the CoNiCr target. As a result, the CoNiCr target was sputtered whereby a CoNiCr layer having a film thickness of 15 nm was formed on the surface of the substrate body with the Cr layer at a position opposed to and in parallel with the target.

(10) After forming the CoNiCr layer, the substrate body holder was moved from the film forming chamber 2 to a film forming chamber 3 for forming a C film. Even after the movement, the substrate body was heated and held at 250° C. by an infrared ray lamp. Incidentally, the ultimate vacuum degree of the film forming chamber 3 was exhausted down to $3\times10^{-9}$ Torr before operation and after having moved the substrate body holder, a door valve disposed between the film forming chamber 2 and the film forming chamber 3 was closed.

(11) Ar gas was introduced into the film forming chamber 3 and the gas pressure of the film forming chamber 3 was set to 2 mTorr. A concentration of an impurity included in the used Ar gas was fixed to 10 ppb.

(12) A plasma was generated by applying a voltage of 400 W from a direct current power source to a C target. As a result, the C target was sputtered whereby a C layer having a film thickness of 10 nm was formed on the surface of the substrate body with the CoNiCr layer/Cr layer at a position opposed to and in parallel with the target.

(13) After forming the C layer, the substrate body holder was moved from the film forming chamber 2 to a unloading chamber. Thereafter, $N_2$ gas was introduced into the unloading chamber and the chamber was brought under the atmosphere pressure and thereafter, the substrate body was picked out. A magnetic recording medium having a layer structure of C/CoNiCr/Cr/NiP/Al was fabricated by the above-described steps of (1) through (12).

Incidentally, impurities were reduced as small as possible in respect of the targets. Impurities of the target for forming Cr were Fe:88, Si:34, Al:10, C:60, O:120, N:60, H:1.1 (wtppm). A composition of the target for forming a ferromagnetic metal layer was Ni:29.2 at %, Cr:7.3 at %, Co: bal. and impurities were Fe:27, Si<10, Al<10, C:30, O:20, N>10 (wtppm).

Figure 2:
FIG. 2 is a transmission electron microscope (TEM) photograph of Sample 2 according to Embodiment 1.

FIG. 1 and FIG. 2 are TEM (Transmitting electron microscope) photographs of the ferromagnetic metal layer of the fabricated medium. FIG. 1 and FIG. 2 show cases where the ultimate vacuum degrees for film formation in the film forming chamber 2 differ where FIG. 1 shows a case of $3\times10^{-9}$ Torr (Sample 1) and FIG. 2 shows a case of $1\times10^{-7}$ Torr (Sample 2).

Conditions of observation by TEM is shown in the following Table 2.

TABLE 2

[Fabrication method of sample]

(1) Mechanical polishing was conducted from a face of a sample where films were not formed whereby the thickness of the sample was reduced to 10 μm or lower.
(2) Further, ion milling was conducted from the face of the sample where films were not formed whereby the thickness of the sample was reduced to 5 nm or less. Major processing conditions were Ar ion beam; 4.5 kV × 5 mA and incident angle of 15°.
[Conditions of observation by TEM]

(1) TEM used: HF 2000 made by Hitachi Co., Ltd.
(2) Acceleration voltage: 200 kV It was confirmed that both of concentrations of oxygen included in the ferromagnetic metal layers of the two samples were 100 wtppm or lower. The measurement of oxygen concentrations was conducted by using a Secondary Ion Mass Spectrometer (SIMS).

However, it was known from the photographs of TEM that the behaviors of intermediaries between crystal grains were different in respect of Sample 1 and Sample 2. That is, in the case of Sample 1 (FIG. 1), grain boundaries comprising an amorphous structure were present among crystal grains forming the ferromagnetic metal layer whereas in the case of Sample 2 (FIG. 2), grain boundaries corresponding to those of Sample 1 could not be confirmed.

Figure 3:
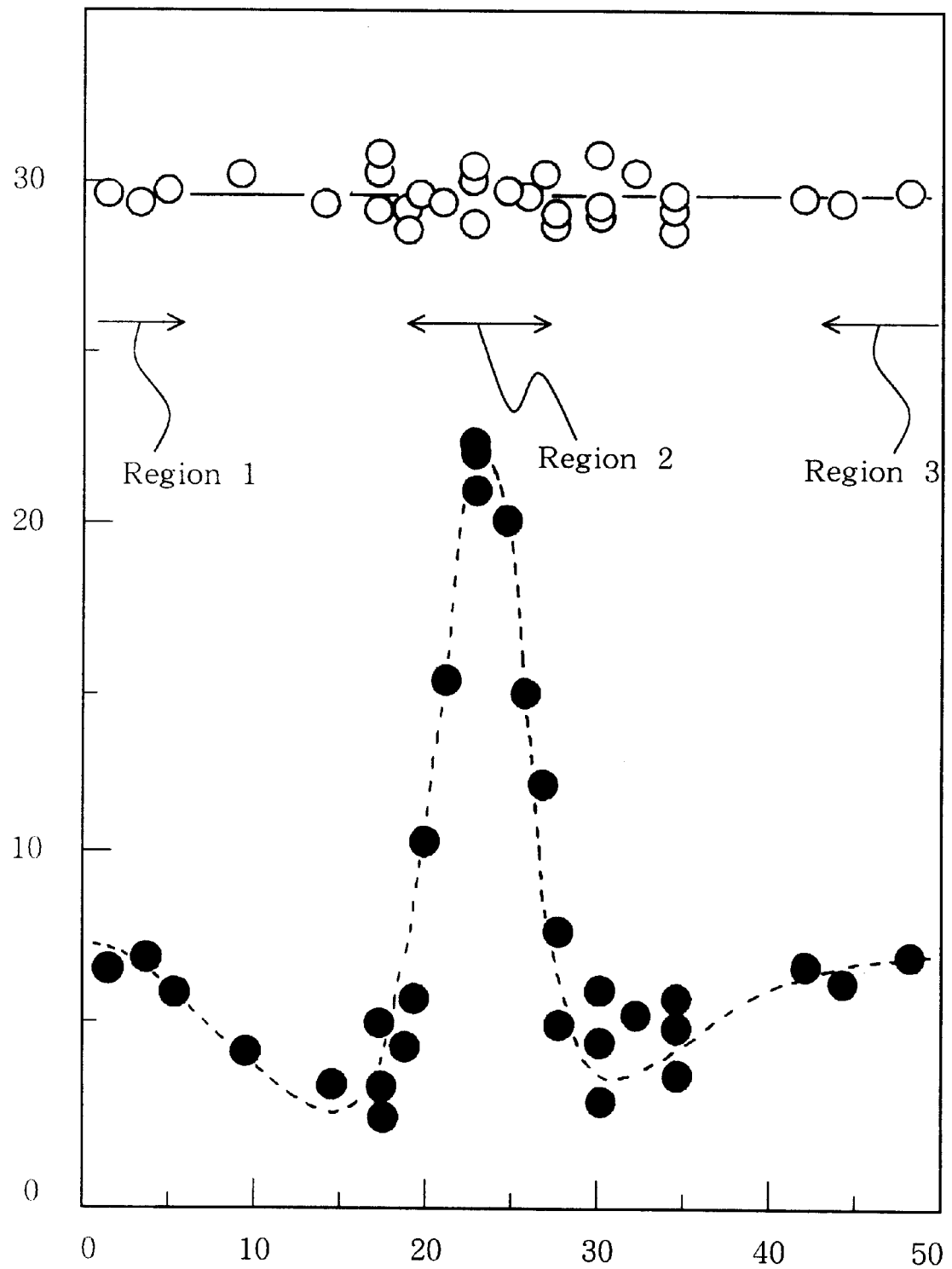
FIG. 3 is a graph showing a result of composition analysis by using an EDS (Energy Dispersive X-ray Spectroscopy) in respect of an intermediary between crystal grains of Sample 1 according to Embodiment 1.

FIG. 3 shows a result of composition analysis by using an Energy Dispersive X-ray Spectroscopy (EDS) with respect to an intermediary between two crystal grains in Sample 1 (FIG. 1). At vicinities of centers of the crystal grains (regions 1 and 3) were provided with compositions which were near to the target composition. However, it was known that the Cr concentration was significantly high at the vicinity of the grain boundary (region 2) and the region was nonmagnetic in view of the alloy composition.

An explanation will be given of respective measurement conditions of the magnetic properties and the electromagnetic conversion characteristics of the magnetic recording media. The magnetic measurement was conducted by using Vibrated Sample Type Magnetic Force Meter (VSM) and a torque magnetic force meter. The details of measurement conditions are shown in Table 3.

TABLE 3

| Item | Set value |
|---|---|
| [VSM] | |
| (1) Shape of sample | 8 mmφ, formed on one face of a disk substrate body |
| (2) Magnetic field application direction | In film face and in circumferential direction of disk substrate body |
| (3) Maximum applied magnetic field | 15 kOe |
| [Torque] | |
| (1) Shape of sample | 8 mmφ, films were formed on one face of a disk substrate body |
| (2) Magnetic field application direction | Magnetic field was applied by rotating 360° in respect of film face (0°) |
| (3) Applied magnetic field | 10 kOe |

Figure 4:
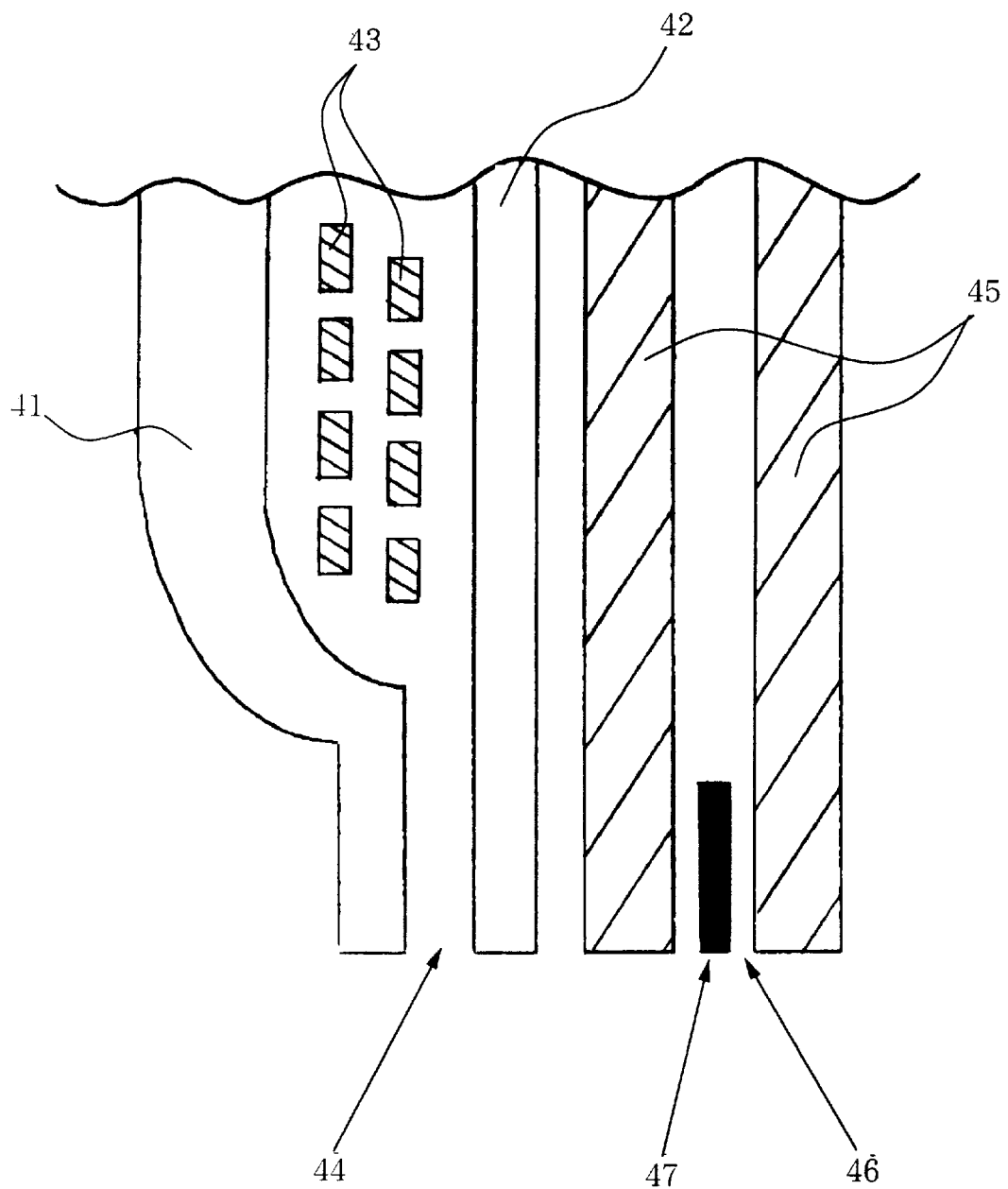
FIG. 4 is a schematic sectional view showing a magnetic pole structure of a thin film head of a read out integrated type that is used for evaluating an electromagnetic conversion characteristic of a magnetic recording medium according to Embodiment 1.

Further, the electromagnetic conversion characteristics were measured under measurement conditions of Table 4 by using a read and write integrated type thin film head (where writing was conducted by an Inductive Head and reading was conducted by an MR head (Magnetic Resistance Head)) shown by FIG. 4.

TABLE 4

[Evaluation conditions of electromagnetic conversion measurement]

Medium:

Diameter and shape of substrate body = 89 mm, disk shape
Substrate body material = NiP/Al
Layer structure = C(10 nm)/CoNiCr(15 nm)/Cr(50 nm)/Substrate body
Product of remaining magnetic flux density by magnetic layer film thickness = 100 gauss · μm
Head:

Kind = Thin film head
(Inductive head)
Write gap length = 0.60 μm
Core width = 6.0 μm
Turn number of coil = 14 turns
(MR head)
Read gap length = 0.38 μm
Core width = 3.5 μm
Sense current = 5–20 mA
Evaluation conditions: name of measuring instrument/501 made by Guzik Co., Ltd.

Peripheral speed in rotating disk = 15.3 m/sec
Flight height = 80–100 nm (including film thickness (10 nm) of protective film)
Overwrite frequency = 5.25/21.0 MHz
(17.4/69.7 KFCI)
Write frequency $f_0$ = 21.0 MHz
Noise band width = 42.0 MHz
Resolution band width $Æf$ = 100 kHz
Medium noise N (unit: μVrms) was defined by the following equation.

$N(f_0) = \sqrt{\{(\Delta f)^{-1} \int_0^{f^{max}}[(Nm(f,f_0))^2 - (Ne(f))^2]df\}}$
: Nin(f) = Medium noise spectral
: Ne(f) = Electric circuit noise spectral The following Table 5 shows a result of measuring the magnetic properties and the electromagnetic conversion characteristics of the magnetic recording media formed under conditions whereby the structures of FIG. 1 and FIG. 2 were provided.

TABLE 5

| Name of sample | Sample 1 | Sample 2 |
|---|---|---|
| Ultimate vacuum degree in forming base layer (Torr) | In the order of $10^{-9}$ | In the order of $10^{-7}$ |
| Presence or absence of grain boundaries comprising an amorphous structure | present | absent |
| Coercive force (Oe) | 2450 | 1050 |
| Hc/Hk | 0.35 | 0.18 |
| S/N (dB) | 23.6 | 14.0 |

It was known from the result of Table 5 that Sample 1 was superior to Sample 2 not only in the magnetic property but also in the electromagnetic conversion characteristic. Accordingly it was determined that the sample having grain boundaries comprising an amorphous structure among crystal grains for forming the ferromagnetic metal layer, was the magnetic recording medium capable of corresponding to a higher recording density.

Embodiment 2

The embodiment is different from Embodiment 1 in that CoCrPt was used for the ferromagnetic metal layer in place of CoNiCr. The target composition for forming CoCrPt was $Co_{75}$—$Cr_{13}$—$Pt_{12}$ (at %).

The other points were the same as those in Embodiment 1.

A result (Table 6) depending on the ultimate vacuum degree at the film forming chamber 1 where the metallic base layer was formed before film formation, was confirmed also in this example.

TABLE 6

| Name of sample | Sample 3 | Sample 4 |
|---|---|---|
| Back pressure in forming base layer | Order of $10^{-9}$ Torr | Order of $10^{-7}$ Torr |
| Presence or absence of grain boundaries comprising an amorphous structure | present | absent |
| Coercive force (Oe) | 3400 | 1500 |
| Hc/Hk | 0.37 | 0.20 |
| S/N (dB) | 25.0 | 17.0 |

It was known from the result of Table 6 that Sample 3 was superior to Sample 4 not only in the magnetic property but also in the ferromagnetic conversion characteristic. Accordingly, it was determined that the sample having grain boundaries comprising an amorphous structure among crystal grains for forming the ferromagnetic metal layer, was the magnetic recording medium capable of corresponding to a higher recording density even in the case where the ferromagnetic metal layer was CoCrPt.

Embodiment 3

This embodiment is different from Embodiment 1 in that CoNiCrTa and CoCrPtTa were used for ferromagnetic metal layers in place of CoNiCr. The target compositions used for forming the respective ferromagnetic metal layers were $Co_{82.5}$—$Ni_{26}$—$Cr_{7.5}$—$Ta_4$ and $Co_{75.5}$—$Cr_{10.5}$—$Ta_4$—$Pt_{10}$ (at %).

The other points were the same as those in Embodiment 1.

According to the case of this example, grain boundaries were confirmed without depending on the ultimate vacuum degrees (in the order of $10^{-7}$ Torr and in the order of $10^{-9}$ Torr) at the film forming chamber 1 for forming the metallic base layer before film formation with respect to either of the materials for the ferromagnetic metal layers. However, the sample having a lower value of ultimate vacuum degree was provided with a larger area of grain boundaries (Table 7).

TABLE 7

| Name of sample | Sample 5 | Sample 6 | Sample 7 | Sample 8 |
|---|---|---|---|---|
| Material of magnetic layer | CoNiCrTa | | CoCrPtTa | |
| Back pressure in forming base layer | Order of $10^{-9}$ Torr | Order of $10^{-7}$ Torr | Order of $10^{-9}$ Torr | Order of $10^{-7}$ Torr |
| Presence or absence of grain boundaries comprising amorphous structure | Present | Present | Present | Present |
| Area of grain boundaries comprising amorphous structure | Large | Small | Large | Small |
| Coercive force (Oe) | 2640 | 1270 | 3350 | 1600 |
| Hc/Hk | 0.36 | 0.22 | 0.37 | 0.26 |
| S/N (dB) | 25.3 | 20.3 | 26.1 | 21.5 |

It was known from the result of Table 7 that Sample 5 is superior to Sample 6 and Sample 7 is superior to Sample 8 not only in the magnetic property but also in the electromagnetic conversion characteristic. Accordingly, the sample having a larger area of grain boundaries comprising an amorphous structure among crystal grains for forming a ferromagnetic metal layer, is the magnetic recording medium capable of corresponding to a higher recording density even in the case where Ta element was included in the alloy composition constituting the ferromagnetic metal layer.

Embodiment 4

The embodiment is different from Embodiment 1 in that the film formation was conducted by varying the film thickness of the metallic base layer in a range of 0 through 100 nm.

Further, an investigation was conducted in the case (Condition a) where both of the ultimate vacuum degrees before film formation of the film forming chamber 1 (for forming the metallic base layer) and the film forming chamber 2 (for forming the ferromagnetic metal layer) were in the order of $10^{-9}$ Torr and the case (Condition b) where they are in the order of $10^{-7}$ Torr.

The other points were the same as those in Embodiment 1.

Figure 5:
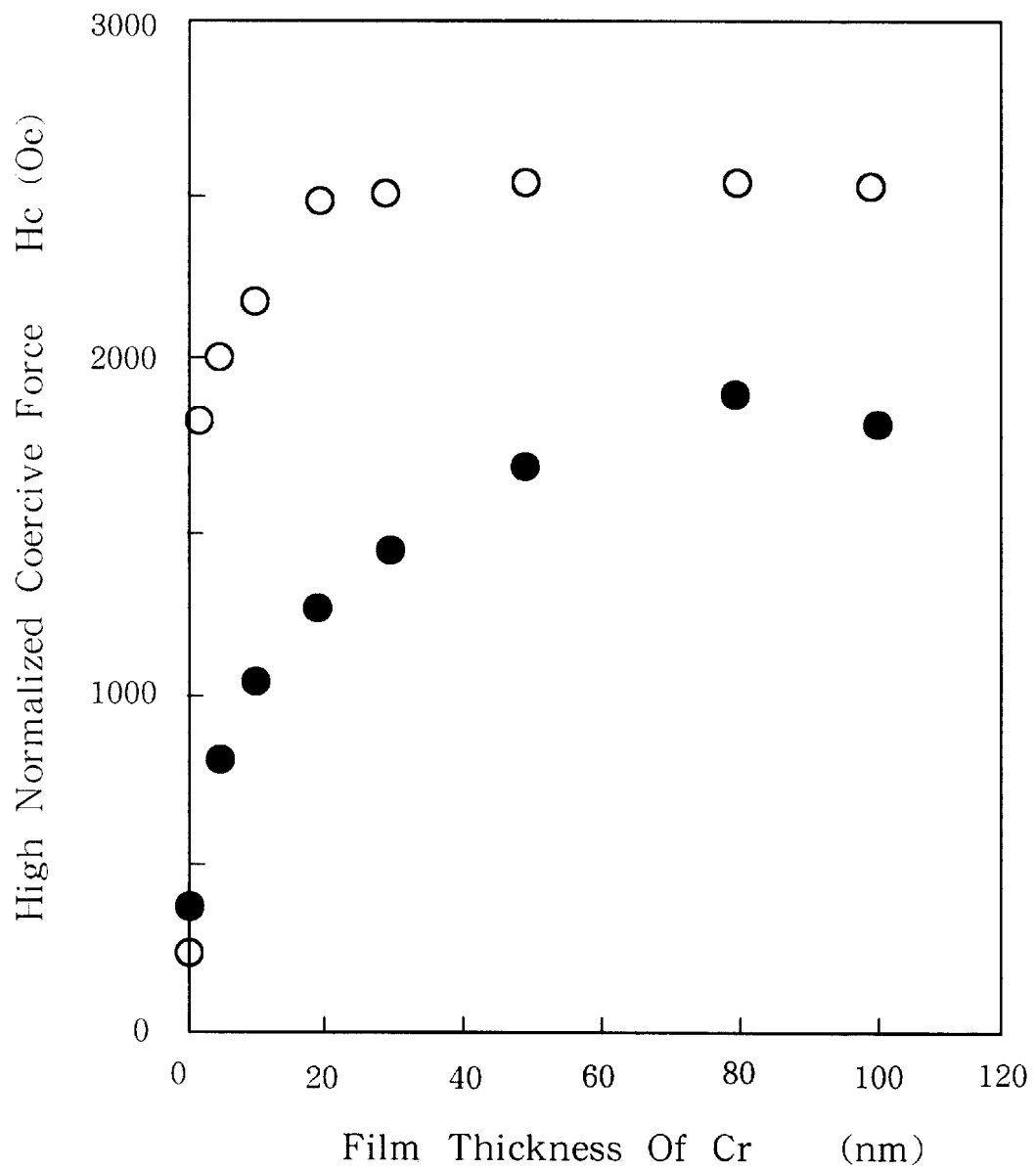
FIG. 5 is a graph showing a relationship between a film thickness of a metallic base layer comprising Cr and a coercive force of a formed medium according to Embodiment 4.

FIG. 5 shows a relationship between the film thickness of the metallic base layer comprising Cr and the coercive force of formed media. The ordinate designates a value of a coercive force in a circumferential direction of a disk-like substrate body where the condition a was indicated by ○ marks and the condition b was indicated by ● marks.

It was known from FIG. 5 that the coercive force of the media under the condition a is provided with a value larger than a maximum value of the media under the condition b when the film thickness of the Cr metallic base layer was equal to or larger than 2.5 nm. Also, it was further preferable that a high coercive force of 2000 Oe or more could be realized when the film thickness of the Cr metallic base layer was 5 nm or more.

Figure 6:
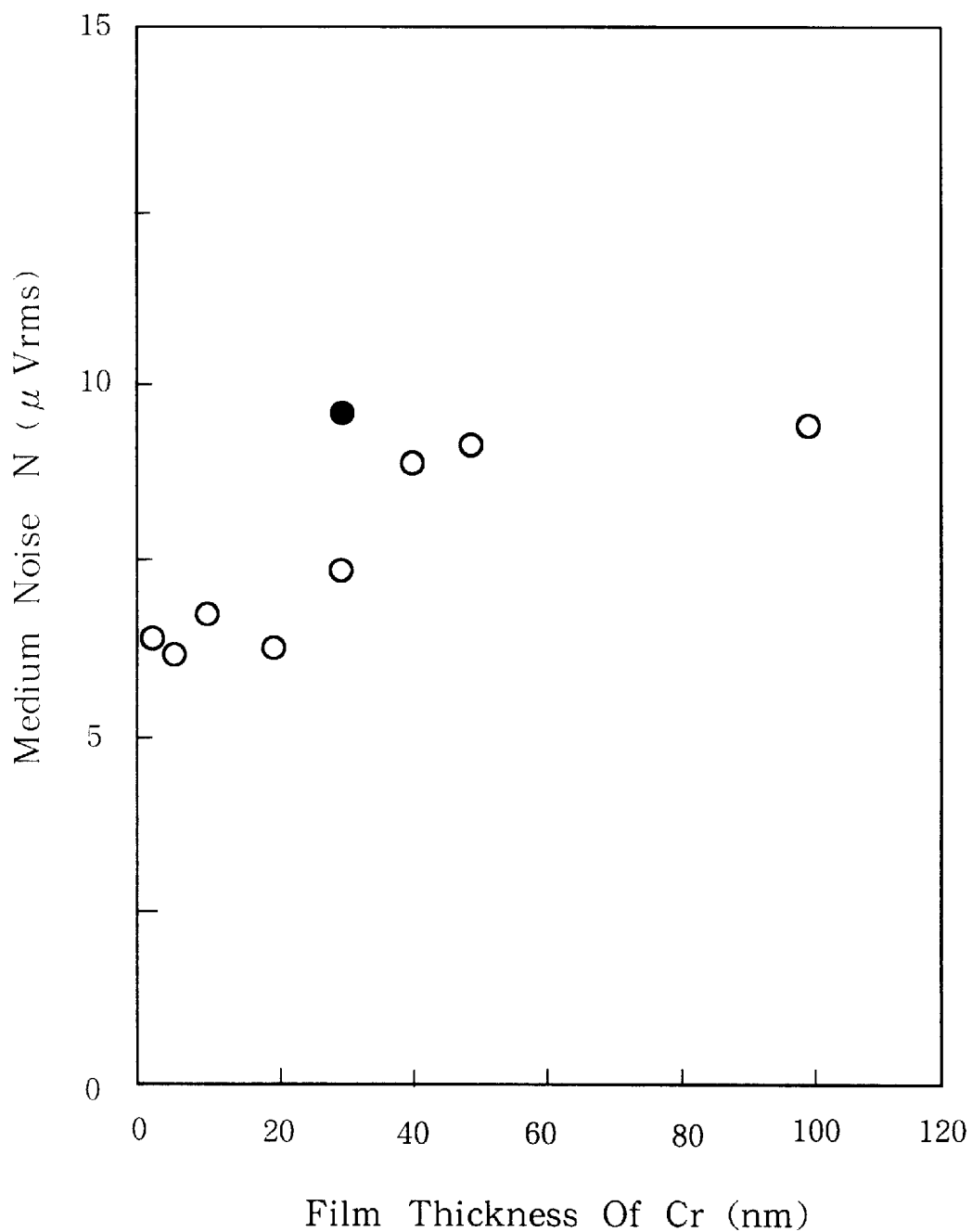
FIG. 6 is a graph showing a relationship between the film thickness of the metallic base layer comprising Cr and noise of the formed medium according to Embodiment 4.

FIG. 6 shows a relationship between the film thickness of the metallic base layer comprising Cr and a noise of formed media. The condition a was indicated by ○ marks and a minimum value of the condition b was indicated by ● mark. The method of measuring a medium noise according to the embodiment was carried out under measurement conditions the same as those in Embodiment 1. Only the film thickness of the Cr layer was made variable from 1 nm to 100 nm and the other conditions were fixed.

It was known from FIG. 6 that the medium noise under the condition a was provided with a value lower than a minimum value of the media under the condition b when the film thickness of the Cr metallic base layer was 100 nm or less. Also, it was further preferable that a medium noise lower by 10% or more could be realized when the film thickness of the Cr metallic base layer was 30 nm or less.

Accordingly, when grain boundaries comprising an amorphous structure are present among crystal grains for forming a ferromagnetic metal layer, that is, in the case of the condition a, the coercive force is higher or a noise of the medium is lower than those under the condition b when the film thickness of a metallic base layer comprising Cr is limited to a range of 2.5 nm through 100 nm. Also, it is further preferable that when the film thickness of the metallic base layer comprising Cr is limited to a range of 5 nm through 30 nm, a sample superior to a sample under the condition b in respect of the coercive force and the noise of the medium can be obtained.

Embodiment 5

The embodiment is different from Embodiment 1 in that the film formation was carried out by varying the surface temperature of the substrate body in a range of 25° C. through 250° C. when the metallic base layer and the ferromagnetic metal layer were formed.

Further, an investigation was carried out in the case where both of the ultimate vacuum degrees before film formation in the film forming chamber 1 (for forming the metallic base layer) and the film forming chamber 2 (for forming the ferromagnetic metal layer) were in the order of $10^{-9}$ Torr (Condition c) and in the case where they were in the order of $10^{-7}$ Torr (Condition d).

The other points were the same as those in Embodiment 1.

Figure 7:
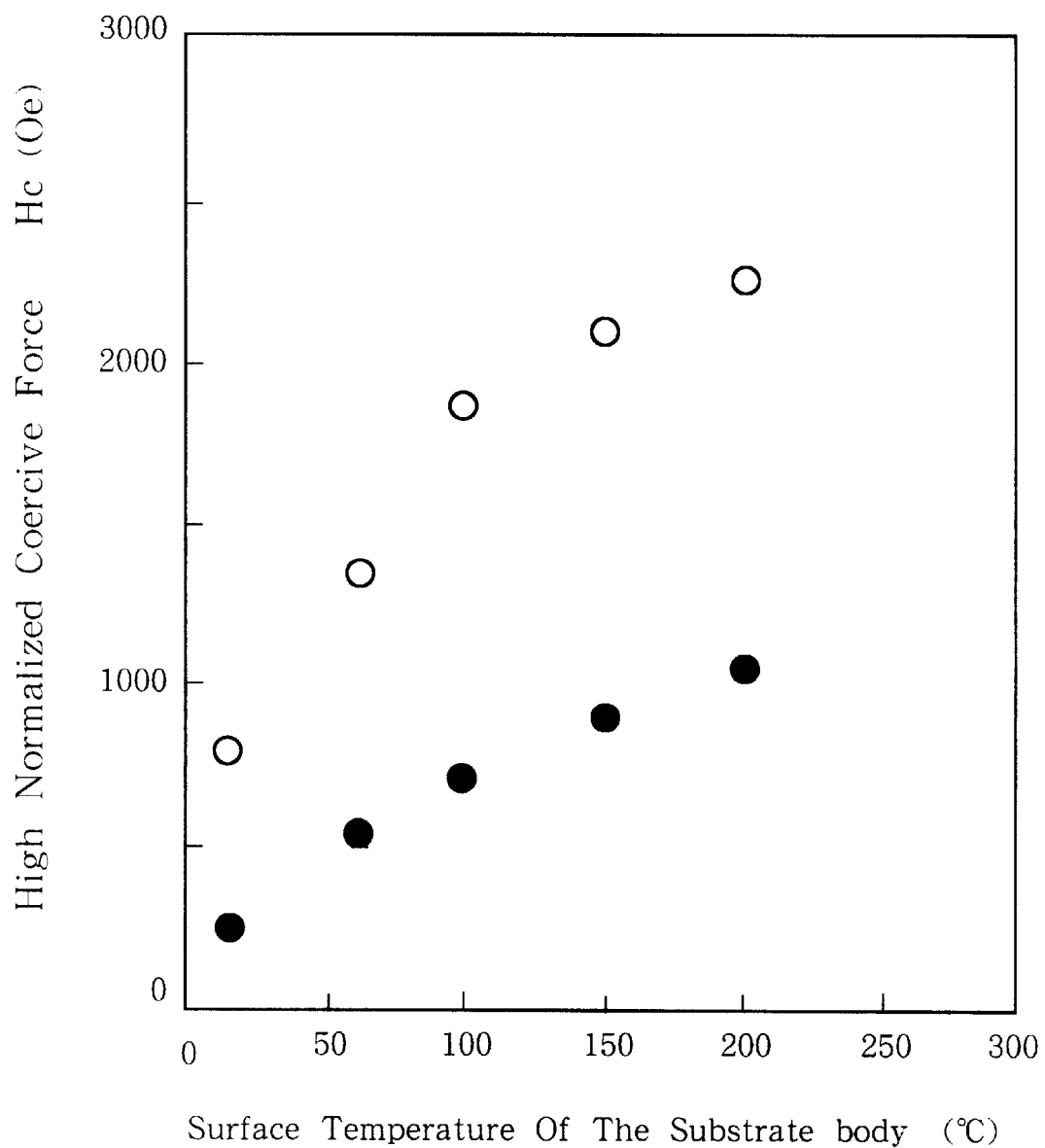
FIG. 7 is a graph showing a relationship between a surface temperature of a substrate body in forming a metallic base layer and a ferromagnetic metal layer according to Embodiment 5 and a coercive force of a formed medium.

FIG. 7 shows a relationship between the surface temperature of the substrate body in forming a metallic base layer and a ferromagnetic metal layer and a coercive force of a formed medium. The ordinate designates a value of the coercive force in the circumferential direction of the disk-like substrate body where the condition c is indicated by ○ marks and the condition d is indicated by ● marks.

Figure 8:
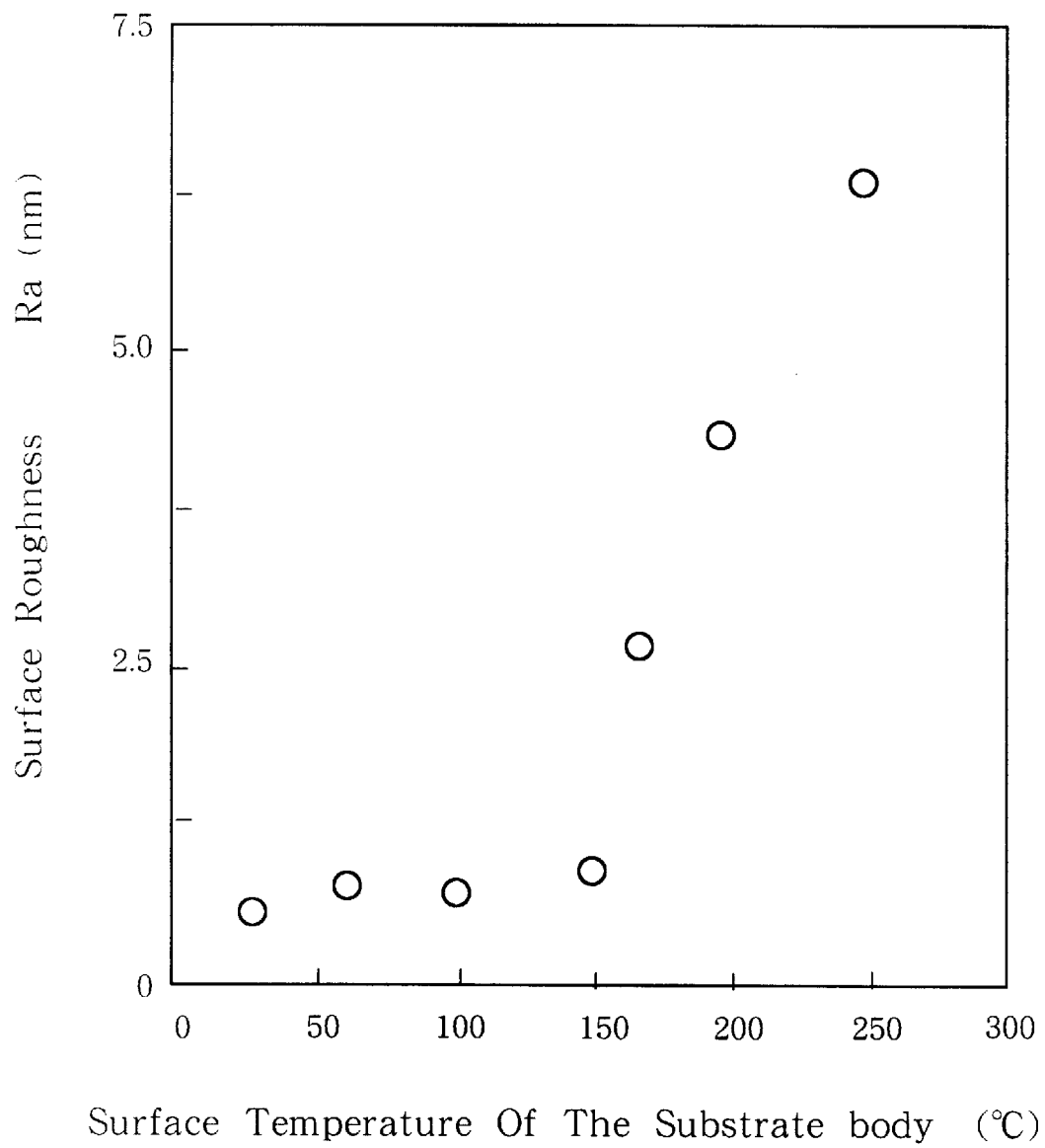
FIG. 8 is a graph showing a relationship between the surface temperature of the substrate body in forming the metallic base layer and the ferromagnetic metal layer according to Embodiment 5 and a surface roughness of Ra of the formed medium.

FIG. 8 shows a relationship between the surface temperature of the substrate body in forming the metallic base layer and the ferromagnetic metal layer and the surface roughness Ra of a formed medium.

A tendency where the coercive force was increased without depending on conditions when the surface temperature of the substrate body was increased, was read from FIG. 7. Further, it was known from FIG. 7 that a high coercive force was obtained under the condition c compared with that under the condition d when the surface temperature was increased to 60° C. or higher.

Meanwhile, as shown by FIG. 8, the surface roughness Ra of the medium was rapidly increased at a temperature of 150° C. or higher. When a magnetic head flying test was conducted in respect of such an medium where the fly height of a magnetic head was set to 15 nm, a phenomenon where the magnetic head collided with the surface of the medium, that is, the head clash frequently occurred.

However, when the surface temperature of the medium in forming the metallic base layer or the ferromagnetic metal layer was set to 60° C. through 150° C., the clash did not occur.

Accordingly, it was known that when grain boundaries comprising an amorphous structure were not present among crystal grains for forming the ferromagnetic metal layer, that is, in order to simultaneously realize the coercive force that is higher than that under the condition d and the fly height of a magnetic head that is lower than 15 nm, the surface temperature of the substrate body in forming the metallic base layer and/or the ferromagnetic metal layer needed to be set to 60° C. through 150° C.

Further, the medium fabrication was feasible at a low temperature where a high coercive force was not obtained conventionally and accordingly, media that could not be utilized for the reason where gases were emitted from a substrate body by heating or the like, for example, ceramics, plastics, resins and the like could be used.

Although a Ni—P/Al substrate was used as the substrate body in the above-described embodiments, it was separately confirmed that the invention was effective also in the case where a nonmagnetic layer was provided on the surface of the substrate body, for example, in the case where a glass substrate or the like on the surface of which Ni—P, Ti, C or the like was formed, was used.

Embodiment 6

The embodiment is different from Embodiment 1 in that when the metallic base layer and the ferromagnetic metal layer were formed, the film formation was conducted by varying a negative bias value applied on the substrate body in a range of 0 through −500 V.

Further, an invention was carried out in the case (Condition e) where the both of ultimate vacuum degrees before film formation of the film forming chamber 1 (for forming the metallic base layer) and the film forming chamber 2 (for forming the ferromagnetic metal layer) were in the order of $10^{-9}$ Torr and in the case (Condition f) where they were in the order or $10^{-7}$ Torr.

The other points were the same as those in Embodiment 1.

Figure 9:
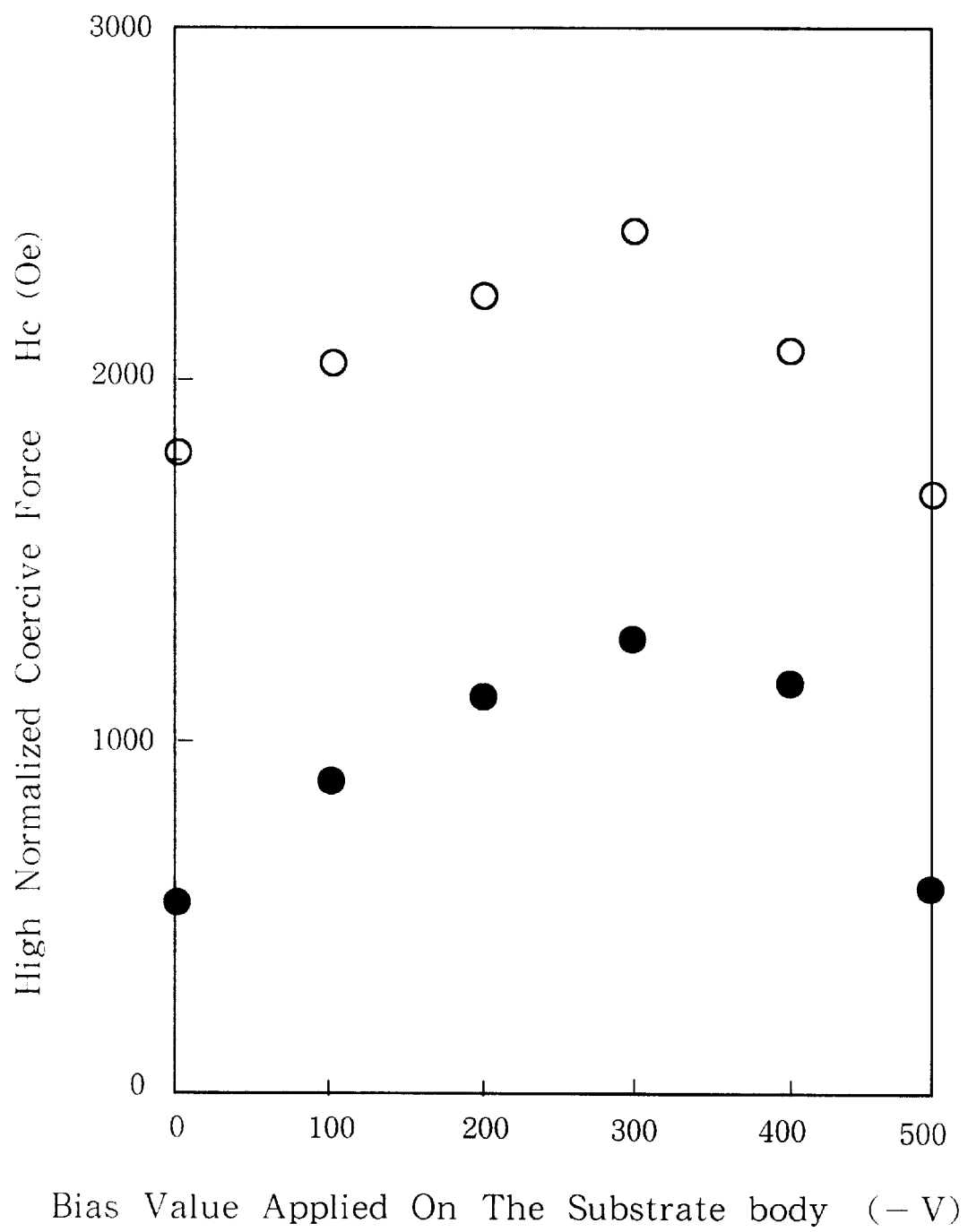
FIG. 9 is a graph showing a relationship between a negative bias value applied on a substrate body and a coercive force of a formed medium according to Embodiment 6.
Figure 10:
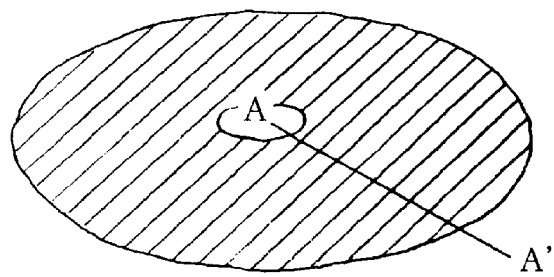
FIG. 10 is an outline view for explaining a magnetic recording medium.
Figure 10:
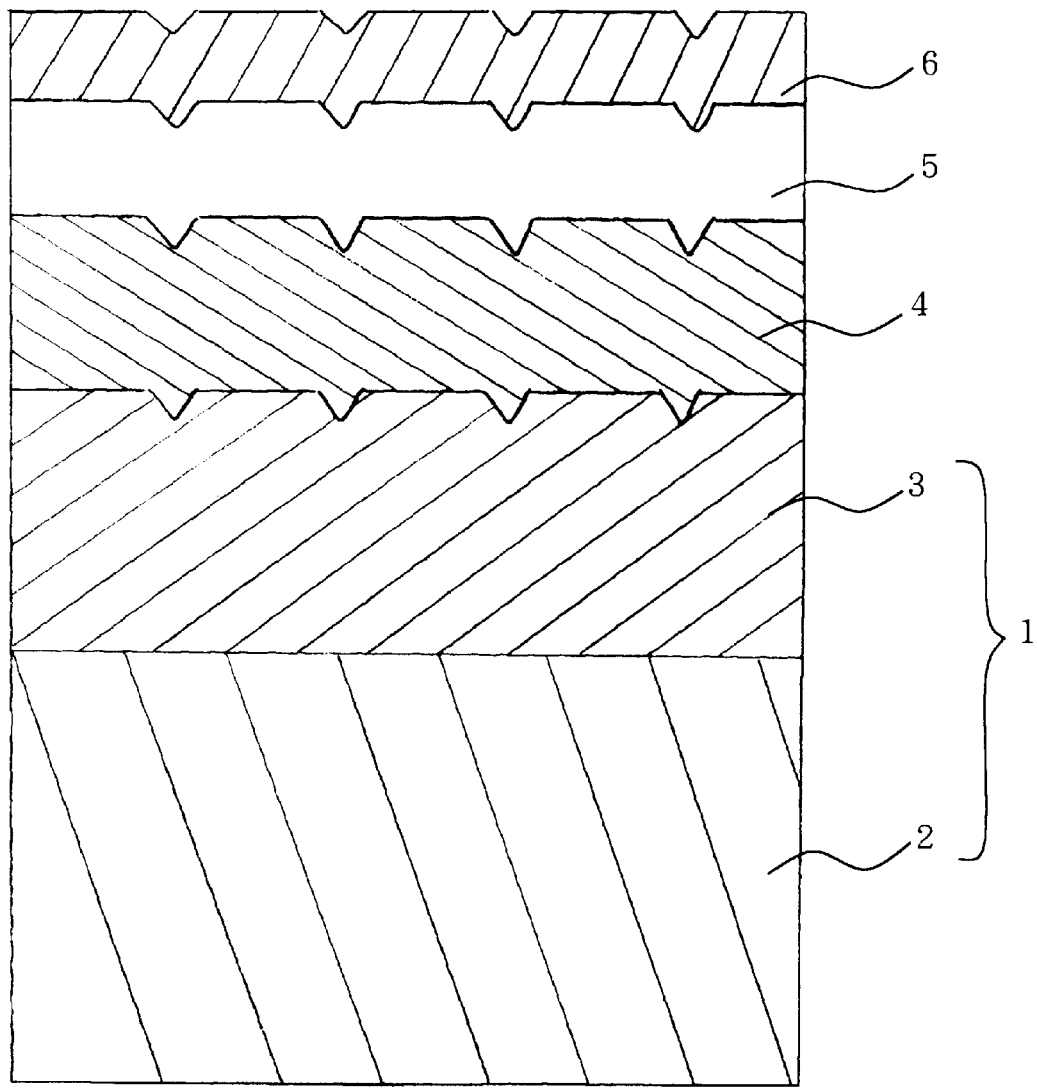

FIG. 9 shows a relationship between a negative bias value applied on the substrate body and a coercive force of a formed medium. The ordinate signifies a value of the coercive force in the circumferential direction of a disk-like substrate body where the condition e is indicated by ○ marks and the condition f is indicated by ● marks.

A tendency where the coercive force was increased without depending on conditions when the value of the bias applied on the substrate body was increased from FIG. 9. Also, a larger coercive force was confirmed from FIG. 9 in the case where the applied bias value under the condition e was null than that in the case where a maximum coercive force was obtained under the condition f (applied bias=−300 V).

Further, the same tendency was confirmed in the case where the bias applied on the substrate body was changed in forming the metallic base layer or the ferromagnetic metal layer.

Therefore, it was confirmed that when grain boundaries comprising an amorphous structure were present among crystal grains for forming the magnetic metal layer, that is, in the case of the condition e formation of a magnetic recording medium having a coercive force higher than that under the condition f was feasible without applying an electric bias to the substrate body other than a self bias caused by a plasma.

As a result, the following problems could be avoided.

(1) Generation of gas or dust from a vicinity of a substrate body (an object or a substrate body supporting member or a substrate body holder).

(2) Not applicable to a nonconductive substrate body such as glass.

(3) A saturated magnetic flux density (Ms) of a formed magnetic film is lowered.

(4) A complicated mechanism needs to be provided in a film forming chamber.

(5) A variation is apt to cause in a degree of applying bias to a substrate body and as a result, a dispersion is apt to cause in the magnetic properties.

Embodiment 7

The embodiment is different from Embodiment 1 in that the ferromagnetic metal layer was formed on the surface of the substrate body without interposing the metallic base layer. Also, $Co_{85}Cr_{15}$ (at %) was used as the ferromagnetic metal layer.

The other points were the same as those in Embodiment 1.

A coercive force in a direction perpendicular to the surface of a magnetic recording medium was investigated. As a result, it was confirmed that a high coercive force was provided in the case where the ultimate vacuum degree of a film forming chamber for forming the ferromagnetic metal layer was in the order to $10^{-9}$ Torr compared with the case where it was in the order of $10^{-7}$ Torr. Also, it was known that an area of grain boundaries having an amorphous structure among crystal grains for forming the ferromagnetic metal layer was wider where the ultimate vacuum degree was in the order of $10^{-9}$ Torr than that in the case where it was in the order of $10^{-7}$ Torr.

INDUSTRIAL APPLICABILITY

The present invention can provide a magnetic recording medium having a high coercive force and excellent in an S/N ratio (recording signal S, medium noise N) of the electromagnetic conversion characteristic in an longitudinal magnetic recording medium having a ferromagnetic metal layer comprising a CoNiCr alloy magnetic film or a CoCrPt alloy magnetic film that is excellent in mass production stability.

Further, the present invention can provide a magnetic recording medium having a high coercive force even with a perpendicular magnetic recording medium having a ferromagnetic metal layer comprising a CoCr alloy magnetic film.

Additionally, the present invention can provide a method of fabrication where a magnetic recording medium having both a high coercive force and an excellent S/N ratio can easily be formed even if a surface temperature of a substrate body in film formation is low or even if an electric bias is not applied on the substrate body.

What is claimed is:

1. A magnetic recorded medium comprising:
    a substrate body having a surface; and
    a ferromagnetic metal layer having crystal grains including at least CoNiCr formed on said surface via a magnetic base layer, said ferromagnetic layer having an oxygen concentration of 100 wt ppm or lower, said ferromagnetic layer having grain boundaries formed among said crystal grains, said grain boundaries having an amorphous structure.

2. A magnetic recording medium utilizing magnetic inversion in which a ferromagnetic metal layer comprising at least CoCrPt is formed on a surface of a substrate body via a metallic base layer and an oxygen concentration of the ferromagnetic metal layer is 100 wtppm or lower:

wherein grain boundaries having an amorphous structure are formed at least among crystal grains forming the ferromagnetic metal layer.

3. The magnetic recording medium according to claim 1 or 2, wherein grain boundaries are nonmagnetic.

4. The magnetic recording medium according to any one of claims 1 through 3, wherein the ferromagnetic metal layer includes Ta as a fourth element.

5. The magnetic recording medium according to any one of claims 1 through 4, wherein the metallic base layer is made of Cr.

6. The magnetic recording medium according to any one of claims 1 through 5, wherein a film thickness of the metallic base layer is in a range of 5 nm through 30 nm.

7. The magnetic recording medium according to any one of claims 1 through 4, wherein the ferromagnetic metal layer is formed on the surface of the substrate body without interposing the metallic base layer.

8. A method of manufacturing a magnetic recording medium according to any one of claim 1 through 7 in which a method of forming the metallic base layer and/or the ferromagnetic metal layer is a sputtering film forming method:

wherein a surface temperature of a substrate body in forming the metallic base layer and/or the ferromagnetic metal layer is in a range of 60° C. through 150° C.

9. A method of manufacturing the magnetic recording medium according to any one of claim 1 through 8, wherein an electric bias is not applied on the substrate body other than a self bias caused by a plasma in forming the metallic base layer and/or the ferromagnetic metal layer.

* * * * *